United States Patent
He et al.

(10) Patent No.: US 10,810,127 B2
(45) Date of Patent: Oct. 20, 2020

(54) SOLID-STATE HARD DISK AND DATA ACCESS METHOD FOR USE WITH SOLID-STATE HARD DISK

(71) Applicant: SHENZHEN DAPU MICROELECTRONICS CO., LTD., Shenzhen (CN)

(72) Inventors: Haibo He, Shenzhen (CN); Qing Yang, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 31 days.

(21) Appl. No.: 16/251,251

(22) Filed: Jan. 18, 2019

(65) Prior Publication Data

US 2019/0155737 A1 May 23, 2019

Related U.S. Application Data

(63) Continuation of application No. PCT/CN2017/097331, filed on Aug. 14, 2017.

(30) Foreign Application Priority Data

Aug. 19, 2016 (CZ) .......................... 2016 1 0690098

(51) Int. Cl.
| | | |
|---|---|---|
| *G06F 12/00* | (2006.01) | |
| *G06F 12/0871* | (2016.01) | |
| *G06F 3/06* | (2006.01) | |
| *G06F 12/123* | (2016.01) | |
| *G06F 12/02* | (2006.01) | |
| *G06F 12/0868* | (2016.01) | |

(Continued)

(52) U.S. Cl.
CPC ............ *G06F 12/0871* (2013.01); *G06F 3/06* (2013.01); *G06F 3/0622* (2013.01);
(Continued)

(58) Field of Classification Search
CPC ...... G06F 12/0871; G06F 3/06; G06F 12/123; G06F 3/0622; G06F 12/0246;
(Continued)

(56) References Cited

U.S. PATENT DOCUMENTS 5,542,066 A * 7/1996 Mattson .............. G06F 12/0804
711/113
8,386,714 B2 2/2013 Belluomini et al.
(Continued)

FOREIGN PATENT DOCUMENTS

| | | |
|---|---|---|
| CN | 102841850 A | 12/2012 |
| CN | 102981966 A | 3/2013 |

(Continued)

OTHER PUBLICATIONS

International Search Report issued in corresponding International Application No. PCT/CN2017/097331, dated Nov. 10, 2017, with English Translation; 6 pages.

*Primary Examiner* — Mark A Giardino, Jr.
(74) *Attorney, Agent, or Firm* — Bayes PLLC

(57) ABSTRACT

Solid-state drives (SSD) and a data access method for SSD are provided. The method includes the following. Cache acquired data-to-be-written to a preset write cache module. Rank the data-to-be-written in the write cache module according to a least recently used page (LRU) algorithm. When data storage amount of the write cache module reaches a preset value, determine a preset number of replacement data among the infrequently used data-to-be-written according to a preset cache replacement algorithm. Write the replacement data into a flash memory of the SSD. Implementations of the present disclosure can decrease effectively the number of times of rewriting on a flash memory of the SSD, thereby reducing effectively a write amplifying problem of the SSD during data access.

14 Claims, 2 Drawing Sheets

(51) Int. Cl.
*G06F 13/00* (2006.01)
*G06F 13/28* (2006.01)

(52) U.S. Cl.
CPC ...... G06F 12/0246 (2013.01); G06F 12/0868 (2013.01); G06F 12/123 (2013.01); *G06F 2212/2022* (2013.01); *G06F 2212/604* (2013.01); *G06F 2212/7203* (2013.01); *G06F 2212/7205* (2013.01)

(58) Field of Classification Search
CPC ......... G06F 12/0868; G06F 2212/7205; G06F 2212/7203; G06F 2212/2022; G06F 2212/604
See application file for complete search history.

(56) References Cited

U.S. PATENT DOCUMENTS

| | | | | |
|---|---|---|---|---|
| 2007/0220200 A1* | 9/2007 | Gill | ................... | G06F 12/123 711/113 |
| 2010/0174853 A1* | 7/2010 | Lee | ................... | G06F 12/0246 711/103 |
| 2010/0211733 A1* | 8/2010 | Vu | ................... | G06F 12/0802 711/114 |
| 2012/0246392 A1* | 9/2012 | Cheon | ................ | G06F 12/0638 711/103 |
| 2012/0303862 A1 | 11/2012 | Benhase et al. | | |
| 2016/0217071 A1 | 7/2016 | Hu et al. | | |

FOREIGN PATENT DOCUMENTS

| | | |
|---|---|---|
| CN | 103049394 A | 4/2013 |
| CN | 103136121 A | 6/2013 |
| CN | 103345368 A | 10/2013 |
| CN | 103631528 A | 3/2014 |
| CN | 103885728 A | 6/2014 |
| CN | 105224237 A | 1/2016 |
| CN | 105224240 A | 1/2016 |
| CN | 105677511 A | 6/2016 |
| CN | 106227471 A | 12/2016 |

* cited by examiner

SOLID-STATE HARD DISK AND DATA ACCESS METHOD FOR USE WITH SOLID-STATE HARD DISK

CROSS-REFERENCE TO RELATED APPLICATION(S)

The present application is a continuation of International Application No. PCT/CN2017/097331, filed on Aug. 14, 2017, which claims priority to Chinese Patent Application No. 201610690098.7, filed on Aug. 19, 2016. The entire contents of both applications are incorporated herein by reference.

TECHNICAL FIELD

This disclosure relates to the field of computer science, and more particularly, to an solid-state drive (SSD) and a method for data access applicable to an SSD.

BACKGROUND

SSD is a hard disk which is made by adopting a solid-state electronic storage chip array SSD can include a control unit and a storage unit (a flash memory chip generally).

A widely used storage unit of SSD is generally a NAND gate flash memory, which is unable to conduct rewritings where the original data are stored. The reasons for which the NAND gate flash memory is unable to conduct rewritings where the original data were stored are as follows. First, a byte in the NAND gate flash memory can only change from 1 to 0, which is unable to be achieved conversely. In addition, as to a write operation on the SSD, the minimum operating unit is page. Based on the above two characters, all write operations need to be conducted on a new page with all bytes thereof being 1. In this way, on a new page on which all bytes are 1, data storage can be achieved by changing some bytes from 1 to 0 while keeping certain bytes as 1 in accordance with actual requirements.

According to the above storage means, preparing the new page with all bytes thereof being 1 for the write operation includes the following process, conducting data erasing in units of a data block in the storage unit, that is to say, change all bytes of each page of the data block into 1 and use these pages for new data writing.

The data pages of a data block can be divided into valid pages and invalid pages according to the validity of the data thereof. Data on the valid pages are valid data, and data on the invalid pages are invalid data. The data block erased may include valid pages. In this case, it is necessary to copy the valid pages to another data block to avoid data loss, which results in an extra write operation of the flash memory. In some situations, the extra write operation of the flash memory can even occur multiple times, which is referred to as write amplification. Write amplification not only reduces storage performance of the SSD but also shortens service life of the SSD.

In the prior art, Trim technology has been proposed for reducing impact of write amplification of the SSD. The principle of the Trim technology is to notify a control system of the SSD of invalid pages in advance to avoid unnecessary copies of pages during block erasing. In this way, during the block erasing, the invalid pages can be directly erased, thereby reducing write amplification.

Through research, the inventor of this application has found that the prior art has at least the following limitation.

As to applications with active data pages such as online transaction, big data application, enterprise system, etc., there still exists write amplification in the SSD used for these applications. That is to say, there still exists a problem of poor storage performance and short service life of the SSD.

SUMMARY

Disclosed herein are technical solutions to reduce write amplification of an SSD.

According to a first aspect of the present disclosure, a method for data access on an SSD is provided. The method includes the following: cache acquired data-to-be-written to a preset write cache module; rank the data-to-be-written in the write cache module according to a least recently used page (LRU) algorithm; when data storage amount of the write cache module reaches a preset value, determine a preset number of replacement data among the infrequently used data-to-be-written according to a preset cache replacement algorithm; write the replacement data into the flash memory of the SSD.

As an implementation, after caching the acquired data-to-be-written to the preset write cache module, the method further includes the following: group the data-to-be-written according to a grouping rule, which includes grouping according to an rewrite interval value of the data-to-be-written; record page information of the data-to-be-written, and the page information includes group information of the data-to-be-written. Prior to writing the replacement data into the flash memory of the SSD, the method further includes the following: determine a target data block in the flash memory of the SSD according to group information of the replacement data.

As an implementation, the grouping rule further includes the following: when pages of a data block in the SSD are unable to be entirely rewritten in synchrony during rewriting, divide a valid page and an invalid page into different groups.

As an implementation, the synchronous rewriting is determined by determining whether a time difference between a time point at which any one data page of the data block is rewritten and a time point at which any other data page of the data block is rewritten is shorter than a preset duration.

As an implementation, the method further includes the following: revise group information of the valid page by increasing a rewrite interval value of the valid page.

According to a second aspect of the present disclosure, SSD is provided. The SSD include a write cache module, a flash memory, and a control device. The write cache module is configured to cache acquired data-to-be-written. The control device includes a ranking unit, a replacing unit, and a writing unit. The ranking unit is configured to rank the data-to-be-written in the write cache module according to an LRU algorithm. The replacing unit is configured to determine a preset number of replacement data among the infrequently used data-to-be-written according to a preset replacement procedure, when data storage amount of the write cache module reaches a preset value. The writing unit is configured to write the replacement data into a flash memory of the SSD.

As an implementation, the control device further includes a grouping unit, a recording unit, and a determining unit. The grouping unit is configured to group the data-to-be-written after the acquired data-to-be-written are cached into the preset write cache module according to a grouping rule, and the grouping rule includes grouping according to a rewrite interval value of the data-to-be-written. The recording unit is configured to record page information of the data-to-be-written, and the page information includes group information of the data-to-be-written. The determining unit is configured to determine a target data block in the flash memory of the SSD according to group information of the replacement data prior to the replacement data being written into the flash memory of the SSD.

As an implementation, the grouping rule further includes the following: when pages of a data block in the SSD are unable to be entirely rewritten in synchrony during rewriting, divide a valid page and an invalid page into different groups.

As an implementation, the synchronous rewriting is determined by determining whether a time difference between a time point at which any one data page of the data block is rewritten and a time point at which any other data page of the data block is rewritten is shorter than a preset duration.

As an implementation, the SSD includes a revising unit. The revising unit is configured to revise group information of the valid page by increasing a rewrite interval value of the valid page.

In implementations of the disclosure, the data-to-be-written are first written into the preset write cache module and ranked according to the LRU algorithm. In this way, the infrequently used data-to-be-written are at a bottom of a ranking sequence, and can be selected among the data-to-be-written and then be written into the flash memory of the SSD. Since the probability of these infrequently used data-to-be-written being rewritten frequently is low, the number of times of rewriting in the flash memory of the SSD can be effectively reduced, thereby decreasing effectively write operations on the flash memory and reducing write amplification of the SSD during data access.

In addition, in implementations of the disclosure, the data-to-be-written are further grouped according to the rewrite interval of the data-to-be-written are. By writing data of synchronous rewrite interval into the same data block, each data block is made to include data pages with the same rewrite interval as far as possible, thereby decreasing probability of a data block including valid pages and invalid pages at the same time. Since during block erasing, when pages of the data block are all invalid pages, it is unnecessary to conduct an extra write operation, that is, it is unnecessary to conduct an additional write operation due to transferring a valid page of the data block into another data block, and write amplification can be further reduced.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description illustrate merely some implementations of the present disclosure. Those of ordinary skill in the art may also obtain other drawings based on these accompanying drawings without creative efforts.

DETAILED DESCRIPTION

Figure 1:
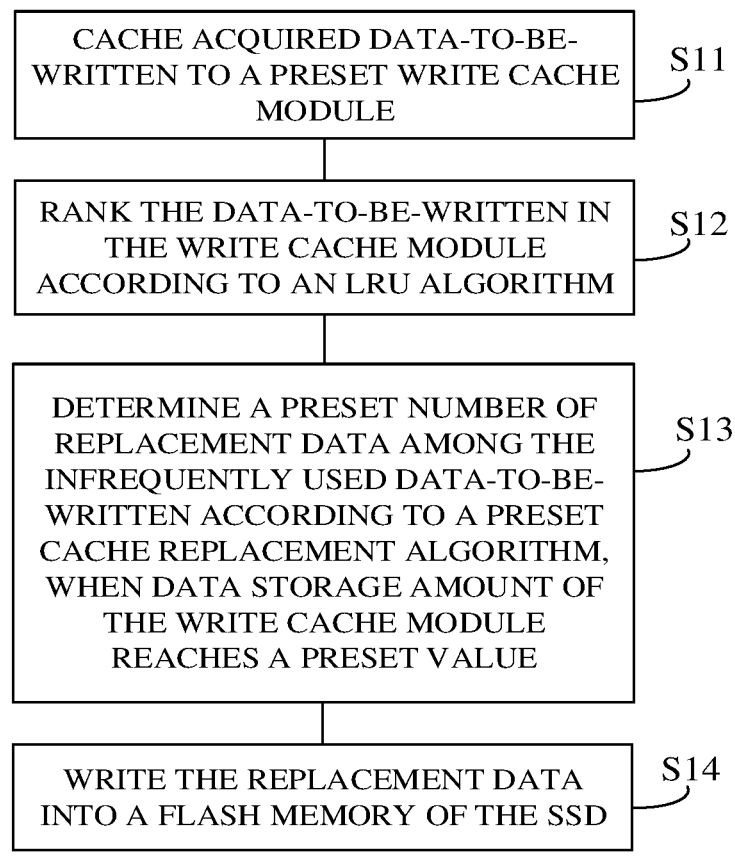
FIG. 1 is a schematic flowchart illustrating steps of a method for data access on an SSD according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

Through research, the inventor has found that situations where write amplification is serious are online transaction, big data application, enterprise system, etc. The reason is that, active pages included in such applications need to be rewritten frequently, which makes the number of times of rewriting in the flash memory increase excessively, thereby making write amplification more serious.

Based on the above finding, in order to reduce write amplification of SSD, a method for data access applicable to the SSD is provided according to implementations of the disclosure. The method includes the following.

At S11, cache acquired data-to-be-written to a preset write cache module.

In implementations of the disclosure, a write cache module configured to cache data-to-be-written is preset. In other words, data written into the SSD (that is, data-to-be-written) are not directly written into a flash memory. Instead, the data are first written into the write cache module.

At S12, rank the data-to-be-written in the write cache module according to a least recently used page (LRU) algorithm.

Rank the data-to-be-written in the write cache module according to the LRU algorithm, thereby distinguishing data which are infrequently used.

According to the implementations of the disclosure, use frequency (that is, rewrite frequency) of an active data page is usually high, so the data can stay ranking high in a ranking sequence according to the LRU algorithm after being written into the write cache module. On the contrary, ranking low in the sequence are those data pages with low rewrite frequency in general. Therefore, by ranking the data-to-be-written in the write cache module, the active data page can be distinguished from those data pages which are less active among the data-to-be-written. Based on the LRU algorithm, since the data-to-be-written are ranked according to activeness, that is, whether the data are frequently used, the data pages which are less active among the data-to-be-written can also be referred to as infrequently used data-to-be-written.

At S13, when data storage amount of the write cache module reaches a preset value, determine a preset number of replacement data among the infrequently used data-to-be-written according to a preset cache replacement algorithm.

Capacity of the write cache module is limited, and thus the write cache module is unable to store the data-to-be-written without limitation. Therefore, it is necessary to have a replacement mechanism to transfer the data pages which are less active to the flash memory from the write cache module, thereby leaving space for subsequent data writing.

In addition, writing of the data into the SSD is completed only after the data are transferred to the flash memory from the write cache module.

First, those skilled in the art can determine a preset value according to actual needs. The preset value can be a specific numeric value or an occupancy rate of the whole capacity of the write cache module, which is not limited herein. For example, the preset value is 80%. When data occupancy in the write cache module reaches 80% of the whole capacity of the write cache module, data replacement begins according to the cache replacement algorithm, that is, determine replacement data among the data pages in the write cache module, thereby clearing the data pages which are less active from the write cache module. It should be noted that, the amount of data to be cleared each time can also be determined by those skilled in the art according to actual needs.

At S14, write the replacement data into the flash memory of the SSD.

After determining the replacement data, the replacement data can be written into the flash memory of the SSD. Since the replacement data are less active, after the replacement data are written into the flash memory, the probability of the data pages being rewritten is low, which can reduce the number of times of rewriting in the flash memory as a whole, thus reducing write amplification of the SSD during data access.

In summary, according to the implementations of the disclosure, the data-to-be-written are first written into the preset write cache module and ranked according to the LRU algorithm. In this way, the infrequently used data-to-be-written are at a bottom of the ranking sequence and can be selected among the data-to-be-written and then be written into the flash memory of the SSD. Since probability of these infrequently used data-to-be-written being rewritten frequently is low, the number of times of rewriting in the flash memory of the SSD can be effectively reduced, thereby decreasing effectively write operations on the flash memory and reducing write amplification of the SSD during data access.

Figure 2:
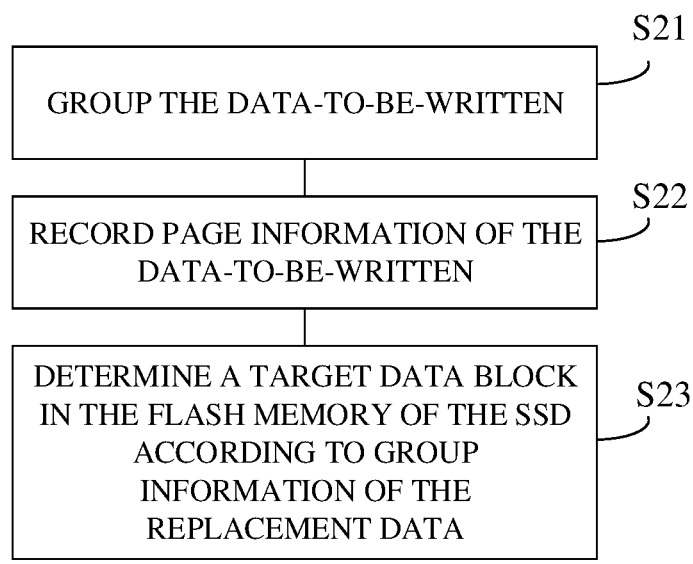
FIG. 2 is another schematic flowchart illustrating steps of a method for data access on an SSD according to an implementation of the present disclosure.

In the implementations of the disclosure, after caching the acquired data-to-be-written to the preset write cache module, the method for data access can further include a process of data grouping, which can include the following operations as illustrated in FIG. 2.

At S21, group the data-to-be-written according to a grouping rule for example. The grouping rule includes grouping according to a rewrite interval value of the data-to-be-written (in the following, "rewrite interval" for short).

According to the implementations of the disclosure, the manner in which the data are written is further optimized. The inventor has found that one important reason why write amplification exists in the related art is that during erasing of a data block, the data block erased includes both an invalid page and a valid page. For this reason, in order to avoid data loss, there is no alternative but to search for a new location for the valid page and write the valid page into the new location before erasing the original data block. In this process, it is possible for the same problem to occur at the new location for the valid page, that is, in order to erase another data block to store the valid page, it is possible to find that the another data block to be erased also includes both an invalid page and a valid page and therefore, the data write operations described above will be repeated.

The inventor, based on the above reason of write amplification, groups the data-to-be-written. The grouping rule includes grouping according to a rewrite interval at which the data-to-be-written. In this way, data pages in each group have a same or similar rewrite interval. Probability of the data pages with the same or similar rewrite interval being rewritten at the same time is high, that is, probability of the data pages in a same group being invalid pages at the same time is high.

At S22, record page information of the data-to-be-written. The page information includes group information of the data-to-be-written.

Based on the grouping rule above, it is necessary to record the page information of the data-to-be-written to mark the group information of each data page in the write cache module.

At S23, prior to writing the replacement data into the flash memory of the SSD, determine a target data block in the flash memory of the SSD according to group information of the replacement data.

During data replacement, after determining the replacement data, it is necessary to determine the target data block in the flash memory of the SSD according to the group information of the replacement data. In this way, data pages in a same group can be written into a same data block.

For example, each data block in the flash memory is 64K (kilobit), data pages marked with Group 001 are 128K, and data pages marked with Group 002 are 640K. In this case, the data pages marked with Group 001 are stored into two data blocks respectively, and the data pages marked with Group 002 are stored into ten data blocks respectively. In this way, data pages in each data block belong to the same group, that is, have the same or similar rewrite interval.

It can be seen from above that, in the implementations of the disclosure, the data-to-be-written are further grouped according to the rewrite interval of the data-to-be-written. By writing data of the same or similar rewrite interval into the same data block, each data block is made to include data pages with the same rewrite interval in general, thereby decreasing probability of a data block including a valid page and an invalid page at the same time. Since during block erasing, when pages of the data block are all invalid pages, it is unnecessary to conduct an extra write operation, that is, it is unnecessary to introduce an additional write operation due to transferring a valid page in the data block into another data block, write amplification can be further reduced.

As one implementation, the grouping rule in the implementations of the disclosure can further include the following operation.

At S24, when pages of a data block in the SSD are unable to be entirely rewritten in synchrony during rewriting, divide a valid page(s) and an invalid page(s) into different groups.

In practice, the manner of grouping the data-to-be-written according to the rewrite interval at S21 may not be effective sometimes after grouping due to data deviation. For example, a value of the rewrite interval of Data Page A is X at the beginning, and Data Page A and other data pages with the value of the rewrite interval being X are written into the same data block of the flash memory. During the data block erasing, when it is found that Data Page A is a valid page while the other data pages are invalid pages, it can be regarded that there is deviation in the value of the rewrite interval of Data Page A. Since synchronous data invalidation of Data Page A and the other data pages fails due to longer validity period of Data Page A compared with validity period of the other data pages, Data Page A can be regrouped by increasing the value of the rewrite interval of Data Page A. In this way, when Data Page A is regrouped, Data Page A can be grouped into another group with longer rewrite interval. As an implementation, group information of the valid data page can be revised by increasing a value of the rewrite interval of the valid page.

In addition, in practice, the synchronous rewriting in the implementations of the disclosure can be determined by determining whether a time difference between a time point at which any one data page of the data block is rewritten and a time point at which any other data page of the data block is rewritten is shorter than a preset duration, such that whether data pages of the data block are rewritten synchronously can be determined by limiting the time difference between rewrite intervals of the data pages.

It can be seen from above that, in the implementations of the disclosure, the data-to-be-written are further grouped according to the interval at which the data-to-be-written are rewritten. By writing data of synchronous rewrite interval into the same data block, each data block is made to include data pages with the same rewrite interval as far as possible, thereby decreasing probability of a data block including a valid page and an invalid page at the same time. Since during block erasing, when pages of the data block are all invalid pages, it is unnecessary to conduct an extra write operation, that is, it is unnecessary to conduct an additional write operation due to the valid page of the data block to be erased in the flash memory, write amplification can be further reduced.

As an implementation, in the implementations of the disclosure, prior to writing the replacement data into the flash memory of the SSD, the data can be compressed to improve data-storage efficiency.

In another implementation of the disclosure, an SSD is provided. The SSD includes a write cache module 01, a flash memory 02, and a control device 03. The write cache module is configured to cache acquired data-to-be-written. The control device 03 includes a ranking unit 31, a replacing unit 32, and a writing unit 33. The ranking unit 31 is configured to rank the data-to-be-written in the write cache module 01 according to an LRU algorithm. The replacing unit 32 is configured to determine a preset number of replacement data among the infrequently used data-to-be-written according to a preset replacement procedure, when data storage amount of the write cache module 01 reaches a preset value. The writing unit 33 is configured to write the replacement data into the flash memory 02 of the SSD.

In the implementation of the disclosure, the write cache module 01 configured to cache data-to-be-written is preset. In other words, data written into the SSD (that is, data to be rewritten) are not directly written into the flash memory 02. Instead, the data are first written into the write cache module 01.

The ranking module 31 is configured to rank the data-to-be-written in the write cache module 01 according to the LRU algorithm, thereby distinguishing data which are infrequently used.

According to the implementations of the disclosure, use frequency (that is, rewrite frequency) of an active data page is usually high, so these data can stay ranking high in a ranking sequence according to the LRU algorithm after being written into the write cache module. On the contrary, ranking low in the sequence are those data pages with low rewrite frequency in general. Therefore, by ranking the data-to-be-written in the write cache module, the active data pages can be distinguished from those data pages which are less active among the data-to-be-written. Based on the LRU algorithm, since the data-to-be-written are ranked according to whether the data are frequently used, the data pages which are less active among the data-to-be-written can also be referred to as infrequently used data-to-be-written.

Capacity of the write cache module is limited, and thus the write cache module is unable to store the data-to-be-written without limitation. Therefore, it is necessary to determine which data need to be written into the flash memory according to a replacement mechanism determined by the replacing unit 32, whereby the data pages which are less active can be transferred to the flash memory 02 from the write cache module 01 by the writing unit 33, thereby leaving space for subsequent data writing. In addition, writing of the data into the SSD is completed only after the data are transferred to the flash memory 02 from the write cache module 01.

First, those skilled in the art can determine a preset value according to actual needs. The preset value can be a specific numeric value or an occupancy rate of the whole capacity of the write cache module 01, which is not limited herein. For example, the preset value is 80%. When data occupancy in the write cache module 01 reaches 80% of the whole capacity of the write cache module 01, data replacement begins according to the cache replacement algorithm, that is, determine replacement data among the data pages in the write cache module 01, thereby clearing the data pages which are less active from the write cache module 01. It should be noted that, the amount of data to be cleared each time can also be determined by those skilled in the art according to actual needs.

After determining the replacement data, the replacement data can be written into the flash memory 02 of the SSD by the writing unit 33. Since the replacement data are less active, after the replacement data are written into the flash memory 02, the probability of the data pages being rewritten is low, which can reduce the number of times of rewriting in the flash memory 02 as a whole, thus reducing write amplification of the SSD during data access.

In summary, according to the implementations of the disclosure, the data-to-be-written are first written into the preset write cache module and ranked according to the LRU algorithm. In this way, the infrequently used data-to-be-written are at a bottom of the ranking sequence and can be selected among the data-to-be-written and then be written into the flash memory of the SSD. Since probability of these infrequently used data-to-be-written being rewritten frequently is low, the number of times of rewriting in the flash memory of the SSD can be effectively reduced, thereby decreasing effectively write operations on the flash memory and reducing write amplification of the SSD during data access.

Figure 3:
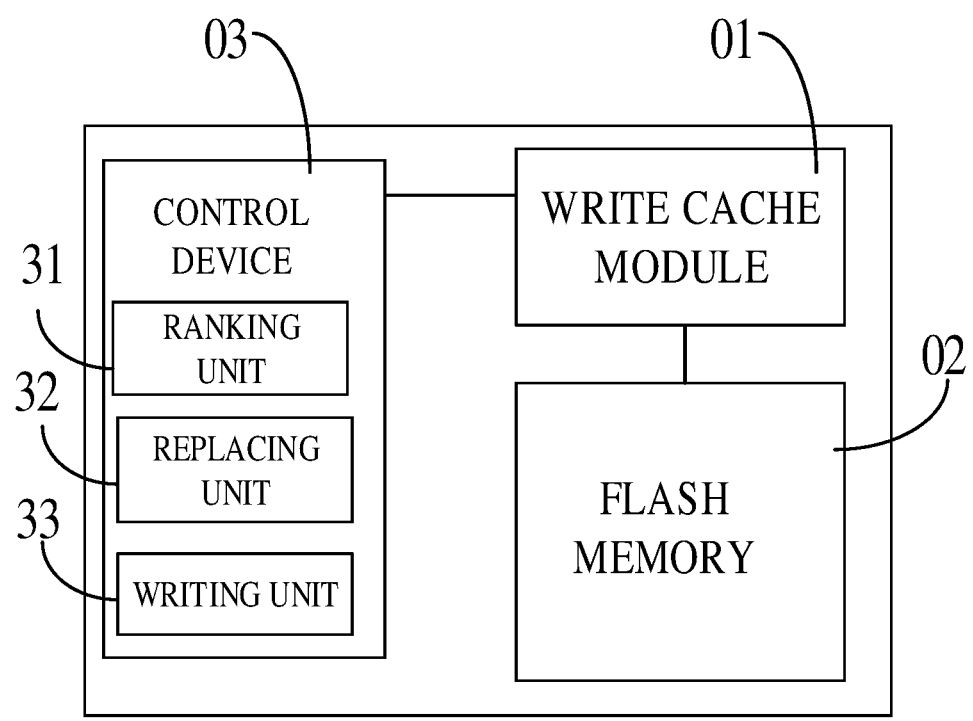
FIG. 3 is a schematic structural diagram illustrating an SSD according to an implementation of the present disclosure.

As an implementation, the control device 03 can further include a grouping unit (not illustrated in FIG. 3), a recording unit (not illustrated in FIG. 3), a determining unit (not illustrated in FIG. 3). The grouping unit is configured to group the data-to-be-written after the acquired data-to-be-written are cached into the write cache module 01 preset according to a grouping rule, and the grouping rule includes grouping according to a rewrite interval value of the data-to-be-written ("rewrite interval" for short). The recording unit is configured to record page information of the data-to-be-written, and the page information includes group information of the data-to-be-written. The determining unit is configured to determine a target data block in the flash memory 02 of the SSD according to group information of the replacement data prior to the replacement data being written into the flash memory 02 of the SSD.

According to the implementations of the disclosure, the manner in which the data are written is further optimized. The inventor has found that one important reason why write amplification exists in the related art is that during erasing of a data block, the data block erased includes both an invalid page and a valid page. For this reason, in order to avoid data loss, there is no alternative but to search for a new location for the valid page and write the valid page into the new location before erasing the original data block. In this process, it is possible for the same problem to occur at the new location for the valid page, that is, in order to erase another data block to store the valid page, it is possible to find that the another data block to be erased also includes both an invalid page and a valid page and therefore, the data write operations described above will be repeated.

The inventor, based on the above reason of write amplification, groups the data-to-be-written. The grouping rule includes grouping according to the interval at which the data-to-be-written are rewritten. In this way, data pages in each group have a same or similar rewrite interval. Probability of the data pages with the same or similar rewrite interval being rewritten at the same time is high, that is, probability of the data pages in a same group being invalid pages at the same time is high.

Based on the grouping rule above, it is necessary to record the page information of the data-to-be-written by the recording unit to mark the group information of each data page in the write cache module.

During data replacement, after determining the replacement data, it is necessary to determine the target data block in the flash memory 02 by the determining unit according to the group information of the replacement data, whereby data pages in a same group can be written into a same data block.

For example, each data block in the flash memory is 64K, data pages marked with Group 001 are 128K, and data pages marked with Group 002 are 640K. In this case, the data pages marked with Group 001 are stored into two data blocks respectively, and the data pages marked with Group 002 are stored into ten data blocks respectively, such that data pages in each data block belong to the same group, that is, have the same or similar rewrite interval.

It can be seen from above that, in the implementations of the disclosure, the data-to-be-written are further grouped according to the rewrite interval of the data-to-be-written. By writing data of synchronous rewrite interval into the same data block, each data block is made to include data pages with the same rewrite interval in general, thereby decreasing probability of a data block including a valid page and an invalid page at the same time. Since during block erasing, when pages of the data block are all invalid pages, it is unnecessary to conduct an extra write operation, that is, it is unnecessary to introduce an additional write operation due to transferring a valid page of the data block into another data block, write amplification can be further reduced.

In practice, the manner of grouping the data-to-be-written according to the rewrite interval at S21 may not be effective sometimes after grouping due to data deviation. For example, a value of the rewrite interval of Data Page A is X at the beginning, and Data Page A and other data pages with the value of the rewrite interval being X are written into the same data block of the flash memory. During the data block erasing, when it is found that Data Page A is a valid page while the other data pages are invalid pages, it can be regarded that there is deviation in the value of the rewrite interval of Data Page A. Since synchronous data invalidation of Data Page A and the other data pages fails due to longer validity period of Data Page A compared with validity period of the other data pages, Data Page A can be regrouped by increasing the value of the rewrite interval of Data Page A. In this way, when Data Page A is regrouped, Data Page A can be grouped into another group with longer rewrite interval. As an implementation, group information of the valid data page can be revised by a revising unit (not illustrated in FIG. 3) by increasing a value of the rewrite interval of the valid data page.

In addition, in practice, the synchronous rewriting in the implementations of the disclosure can be determined by determining whether a time difference between a time point at which any one data page of the data block is rewritten and a time point at which any other data page of the data block is rewritten is shorter than a preset duration. In this way, whether data pages of the data block are rewritten synchronously can be determined by limiting the time difference between rewrite intervals of the data pages.

As an implementation, in the implementations of the disclosure, a compressing unit (not illustrated in FIG. 3) can be further included. The compressing unit can be configured to compress the data to improve data-storage efficiency prior to the replacement data being written into the flash memory of the SSD.

In the implementations of the disclosure, the data-to-be-written are further grouped according to the interval at which the data-to-be-written are rewritten. By writing data of synchronous rewrite interval into the same data block, each data block is made to include data pages with the same rewrite interval in general, thereby decreasing probability of a data block including a valid page and an invalid page at the same time. Since during block erasing, when pages of the data block are all invalid pages, it is unnecessary to conduct an extra write operation, that is, it is unnecessary to conduct an additional write operation due to the valid page of the data block to be erased in the flash memory, write amplification can be further reduced.

It will be appreciated that the systems, apparatuses, and methods disclosed in implementations herein may also be implemented in various other manners. For example, the above apparatus implementations are merely illustrative, e.g., the division of the units (including sub-units) is only a division of logical functions, and there may exist other ways of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one. The integrated units above can be implemented by means of hardware or as software functional units.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. Computer software products can be stored in a storage medium and may include multiple instructions that, when executed, can cause a computing device, e.g., a personal computer, a server, a second adapter, a network device, etc., to execute some or all operations of the methods as described in the various implementations. The above storage medium may include various kinds of media that can store program codes, such as a universal serial bus (USB) flash disk, a mobile hard drive, a read-only memory (ROM), a random access memory (RAM), a resistance random access memory (ReRAM), a magnetic random access memory (MRAM), a pulse-code modulation (PCM), a NAND flash, a NOR flash, a memristor, a magnetic disk, or an optical disk.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data access on a solid-state drive (SSD), comprising:
   caching data-to-be-written to a write cache module of the SSD;
   ranking the data-to-be-written in the write cache module based on use frequency of the data-to-be-written;
   obtaining group information of the data-to-be-written based on a rewrite interval value of the data-to-be-written, wherein obtaining the group information comprises,
      after caching the data-to-be-written, grouping the data-to-be-written based on (i) the rewrite interval value of the data-to-be-written and (ii) dividing valid data pages and invalid data pages into different groups when data pages of a data block in the SSD are unable to be entirely rewritten in synchrony during rewriting, wherein rewriting in synchrony is determined by determining whether a time difference between a time point at which any data page of the data block is rewritten and a time point at which any other data page of the data block is rewritten is shorter than a preset duration,
      recording page information of the data-to-be-written, the page information comprising the group information of the data-to-be-written, and
      prior to writing the replacement data, determining a target data block in the storage unit based on the group information of the replacement data;
   when data storage amount of the write cache module reaches a threshold, determining replacement data from the data-to-be-written based on the ranking of the data-to-be-written; and
   writing the replacement data into a storage unit of the SSD based on group information of the replacement data from the group information of the data-to-be-written.

2. The method of claim 1, wherein:
   the data-to-be-written comprises a plurality of data pages;
   ranking the data-to-be-written in the write cache module comprises ranking the plurality of data pages based on the respective user frequency of each of the data pages; and
   determining the replacement data comprises determining a plurality of replacement data pages from the plurality of data pages based on the ranking of the data pages.

3. The method of claim 1, wherein the data-to-be written is ranked based on a least recently used page (LRU) algorithm.

4. The method of claim 1, wherein the replacement data includes infrequently used data-to-be-written according to the ranking.

5. The method of claim 1, wherein determining the replacement data further comprises determining an amount of the replacement data.

6. The method of claim 1, wherein the storage unit is a flash memory.

7. The method of claim 1, further comprising revising group information of the valid data page by increasing a rewrite interval value of the valid data page.

8. A solid-state drive (SSD), comprising:
   a write cache module configured to cache data-to-be-written;
   a storage unit; and
   a control device, comprising:
      a ranking unit configured to rank the data-to-be-written in the write cache module based on use frequency of the data-to-be-written;
      a grouping unit and a recording unit configured to obtain group information of the data-to-be-written based on a rewrite interval value of the data-to-be-written, wherein
         obtaining the group information comprises, after caching the data-to-be-written, grouping the data-to-be-written based on (i) the rewrite interval value of the data-to-be-written and (ii) dividing valid data pages and invalid data pages into different groups when data pages of a data block in the SSD are unable to be entirely rewritten in synchrony during rewriting, wherein rewriting in synchrony is determined by determining whether a time difference between a time point at which any data page of the data block is rewritten and a time point at which any other data page of the data block is rewritten is shorter than a preset duration,
         recording page information of the data-to-be-written, the page information comprising the group information of the data-to-be-written, and
         prior to writing the replacement data, determining a target data block in the storage unit based on the group information of the replacement data;
      a replacing unit configured to, when data storage amount of the write cache module reaches a threshold, determine replacement data from the data-to-be-written based on the ranking of the data-to-be-written; and
      a writing unit configured to write the replacement data into the storage unit of the SSD based on group information of the replacement data from the group information of the data-to-be-written.

9. The SSD of claim 8, wherein:
   the data-to-be-written comprises a plurality of data pages;
   the ranking unit is further configured to rank the plurality of data pages based on the respective user frequency of each of the data pages; and
   the replacing unit is further configured to determine a plurality of replacement data pages from the plurality of data pages based on the ranking of the data pages.

10. The SSD of claim 8, wherein the data-to-be written is ranked based on a least recently used page (LRU) algorithm.

11. The SSD of claim 8, wherein the replacement data includes infrequently used data-to-be-written according to the ranking.

12. The SSD of claim 8, wherein the replacing unit is further configured to determine an amount of the replacement data.

13. The SSD of claim 8, wherein the storage unit is a flash memory.

14. The SSD of claim 8, further comprising a revising unit configured to revise group information of the valid data page by increasing a rewrite interval value of the valid data page.

* * * * *